(12) United States Patent
Uda

(10) Patent No.: US 10,874,993 B2
(45) Date of Patent: Dec. 29, 2020

(54) PERMEATION SIDE FLOW PATH MATERIAL FOR SPIRAL MEMBRANE ELEMENT AND METHOD FOR MANUFACTURING SAME

(71) Applicant: NITTO DENKO CORPORATION, Osaka (JP)

(72) Inventor: Yasuhiro Uda, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 257 days.

(21) Appl. No.: 15/519,603

(22) PCT Filed: Nov. 12, 2015

(86) PCT No.: PCT/JP2015/081869
§ 371 (c)(1),
(2) Date: Apr. 17, 2017

(87) PCT Pub. No.: WO2016/076397
PCT Pub. Date: May 19, 2016

(65) Prior Publication Data
US 2017/0239626 A1    Aug. 24, 2017

(30) Foreign Application Priority Data

Nov. 13, 2014  (JP) .................................. 2014-230586

(51) Int. Cl.
*B01D 63/10* (2006.01)
*B01D 65/00* (2006.01)
(Continued)

(52) U.S. Cl.
CPC ........... *B01D 71/56* (2013.01); *B01D 61/025* (2013.01); *B01D 61/027* (2013.01); *B01D 61/08* (2013.01);
(Continued)

(58) Field of Classification Search
CPC ........ B01D 2313/143; B01D 2313/146; B01D 2323/30; B01D 61/025; B01D 61/027;
(Continued)

(56) References Cited

U.S. PATENT DOCUMENTS 4,053,418 A     10/1977 Newman
4,476,022 A  *  10/1984 Doll ..................... B01D 63/103
                                                           210/321.83
(Continued)

FOREIGN PATENT DOCUMENTS

CN          102068908         5/2011
FR          2305214          10/1976
(Continued)

OTHER PUBLICATIONS

Search Report issued in Japan Patent Application No. PCT/JP2015/081869, dated Dec. 8, 2015.
(Continued)

*Primary Examiner* — Pranav N Patel
(74) *Attorney, Agent, or Firm* — Greenblum & Bernstein, P.L.C.

(57) ABSTRACT

Provided are an inexpensive, high-quality, permeation-side flow path material that is suitable for use in spiral membrane elements and enables the improvement of productivity, a method for producing such a permeation-side flow path material, and a membrane element having such a permeation-side flow path material. Provided are (a) a permeation-side flow path material for use in a spiral membrane element, the permeation-side flow path material comprising a resin sheet comprising a plurality of ridge portions 31 formed parallel to one another; and a plurality of openings 32 formed between each pair of the ridge portions 31, (b) a method for producing such a permeation-side flow path
(Continued)

material, and (c) a membrane element having such a permeation-side flow path material.

17 Claims, 5 Drawing Sheets

(51) Int. Cl.

| | | |
|---|---|---|
| *C02F 1/44* | (2006.01) | |
| *B01D 69/12* | (2006.01) | |
| *B01D 71/56* | (2006.01) | |
| *B01D 61/02* | (2006.01) | |
| *B01D 61/08* | (2006.01) | |
| *B01D 71/10* | (2006.01) | |
| *B01D 71/48* | (2006.01) | |
| *C02F 103/04* | (2006.01) | |
| *C02F 103/08* | (2006.01) | |

(52) U.S. Cl.
CPC .......... *B01D 63/10* (2013.01); *B01D 63/103* (2013.01); *B01D 65/003* (2013.01); *B01D 69/122* (2013.01); *B01D 71/10* (2013.01); *B01D 71/48* (2013.01); *C02F 1/441* (2013.01); *C02F 1/442* (2013.01); *B01D 2313/143* (2013.01); *B01D 2313/146* (2013.01); *B01D 2323/30* (2013.01); *C02F 2103/04* (2013.01); *C02F 2103/08* (2013.01)

(58) Field of Classification Search
CPC ...... B01D 61/08; B01D 63/10; B01D 63/103; B01D 65/003; B01D 69/122; B01D 71/10; B01D 71/48; B01D 71/56; C02F 1/441; C02F 1/442; C02F 2103/04; C02F 2103/08
See application file for complete search history.

(56) References Cited

U.S. PATENT DOCUMENTS

| | | | | |
|---|---|---|---|---|
| 6,454,942 | B1* | 9/2002 | Shintani | B01D 63/10 210/321.72 |
| 2006/0219635 | A1* | 10/2006 | McCague | C25D 13/24 210/651 |
| 2008/0290031 | A1* | 11/2008 | Popa | B01D 63/082 210/650 |
| 2010/0006504 | A1 | 1/2010 | Odaka et al. | |
| 2011/0232061 | A1* | 9/2011 | Jons | B01D 63/10 29/426.2 |
| 2013/0334128 | A1* | 12/2013 | Takagi | B01D 63/103 210/457 |
| 2016/0016122 | A1 | 1/2016 | Hayakawa et al. | |

FOREIGN PATENT DOCUMENTS

| | | |
|---|---|---|
| JP | 52-79598 | 7/1977 |
| JP | 60-038003 | 2/1985 |
| JP | 61-111501 | 7/1986 |
| JP | 62-57609 | 3/1987 |
| JP | 63-151304 | 6/1988 |
| JP | 3-66008 | 3/1991 |
| JP | 09-141060 | 6/1997 |
| JP | 10-193299 | 7/1998 |
| JP | 10-230145 | 9/1998 |
| JP | 2000-51671 | 2/2000 |
| JP | 2000-237554 | 9/2000 |
| JP | 2006-247453 | 9/2006 |
| JP | 2008-531270 | 8/2008 |
| JP | 2014-044912 | 3/2014 |
| JP | 2014-64973 | 4/2014 |
| JP | 2014-159015 | 9/2014 |
| JP | 2014-184438 | 10/2014 |
| JP | 2014-193460 | 10/2014 |
| WO | 2006/091167 | 8/2006 |

OTHER PUBLICATIONS

English language translation of the Preliminary Report on Patentability recited in PCT/JP2015/081869, dated May 26, 2017.
Office Action issued in Japan Counterpart Patent Appl. No. 2014-230586, dated Nov. 15, 2018, along with an English translation thereof.
Office Action issued in Japan Counterpart Patent Appl. No. 2014-230586, dated Aug. 1, 2018 , along with an English translation thereof.
Office Action issued in China Counterpart Patent Appl. No. 201580056408.3, dated Jun. 4, 2019, along with an English translation thereof.
Office Action issued in Japan Counterpart Patent Appl. No. 2014-230586, dated Jun. 25, 2019, along with an English translation thereof.
Foreign Office Action issued in the corresponding Chinese Patent Application No. 201580056408.3 and English translation, dated Jan. 2, 2020.
China Office Action issued in Chinese Patent Application No. 201580056408.3, dated Jul. 16, 2020, and its English translation.

* cited by examiner

PERMEATION SIDE FLOW PATH MATERIAL FOR SPIRAL MEMBRANE ELEMENT AND METHOD FOR MANUFACTURING SAME

TECHNICAL FIELD

The invention relates to a permeation-side flow path material for use in a spiral membrane element (hereinafter also abbreviated as a "membrane element") for separating and/or concentrating specific substances from a variety of liquids, to a method for producing the permeation-side flow path material, and to a membrane element having the permeation-side flow path material.

BACKGROUND ART

In recent years, big coastal cities in arid and semi-arid regions where stable acquisition of water resources is difficult have tried to produce fresh water by desalination of seawater. In addition, areas poor in water resources, such as China and Singapore, have tried to purify and reuse industrial and domestic wastewater. Recently, efforts have also been attempted to remove oils and salts from oil-containing highly-turbid wastewater discharged from oil field plants and other plants so that the resulting water can be reused. For such water treatment processes, membrane methods using composite semipermeable membranes are known to be effective in terms of cost and efficiency.

Such water treatment processes often use a spiral membrane element, which includes, as shown in FIG. 5, a laminate including a composite semipermeable membrane 2, a supply-side flow path material 6, and a permeation-side flow path material 3; a perforated central tube 5 on which the laminate is wound; and a sealing member 21 for preventing mixing between the supply-side flow path and the permeation-side flow path (see Patent Document 1). During the operation of the membrane element 1, a liquid 7 is supplied from one end of the membrane element 1. The supplied liquid 7 is allowed to flow along the supply-side flow path material 6 and in a direction parallel to the direction A1 of the axis of the central tube 5, and discharged as a concentrated liquid 9 from the other end of the membrane element 1. A permeated liquid 8 also passes through the composite semipermeable membranes 2 during the process of allowing the supplied liquid 7 to flow along the supply-side flow path material 6. As indicated by the broken line arrow in the drawing, the permeated liquid 8 is allowed to flow along the permeation-side flow path material 3 and into the interior of the central tube 5 from openings 5a, and discharged from the end of the central tube 5.

Conventional permeation-side flow path materials for use in spiral membrane elements are produced, for example, using a tricot knit fabric of thermoplastic synthetic fiber filaments such as polyester fiber filaments, which is made rigid by being impregnated with epoxy resin, or using a tricot knit fabric of filaments each including high-melting-point polyester as a core material and low-melting-point polyester as a sheath material, which is made rigid by heat treatment for fusing the low-melting-point resin (Patent Documents 1 and 2).

PRIOR ART DOCUMENTS

Patent Documents

Patent Document 1: JP-A-62-57609
Patent Document 2: JP-B-03-66008

SUMMARY OF THE INVENTION

Problems to be Solved by the Invention

Unfortunately, the production of permeation-side flow path materials using a tricot knit fabric as mentioned above requires many production steps such as a filament spinning step, a tricot knitting step, and a heat treatment step, which makes it difficult to increase productivity or to reduce costs. In addition, the use of fibers as constituent materials can increase the surface roughness of permeation-side flow path materials, which may also have an effect on the pressure loss of permeation-side flow paths.

It is therefore an object of the invention to provide an inexpensive, high-quality, permeation-side flow path material that is suitable for use in spiral membrane elements and enables the improvement of productivity, to provide a method for producing such a permeation-side flow path material, and to provide a membrane element having such a permeation-side flow path material.

Means for Solving the Problems

The object can be achieved by the invention described below.

Specifically, the invention is directed to a method for producing a permeation-side flow path material for use in a spiral membrane element, the method including: a ridge forming step including forming a plurality of ridge portions in a direction along the longitudinal direction of a long resin sheet while feeding the long resin sheet; and an opening forming step including forming a plurality of openings in each of a plurality of rows in a direction along the longitudinal direction of the long resin sheet while feeding the long resin sheet.

In contrast to the case using a knit fabric, the permeation-side flow path material-producing method of the invention uses a long resin sheet as a raw material, which eliminates the need for spinning and knitting steps and thus enables cost reduction and productivity improvement. In addition, the method including the ridge forming step and the opening forming step stably provides the same function as that of the rigid product obtained by impregnating the tricot fabric with epoxy resin. The ridge forming step, which includes forming a plurality of ridge portions in a direction along the longitudinal direction, can be continuously performed using a simple apparatus. The opening forming step, which includes forming a plurality of openings in each of a plurality of rows in a direction along the longitudinal direction, can also be continuously performed using a simple apparatus. The method of the invention also allows the resulting permeation-side flow path material to have a surface roughness smaller than the conventional roughness, which makes it possible to keep the pressure loss low. As a result, there is provided a method for producing an inexpensive, high-quality, permeation-side flow path material that is suitable for use in spiral membrane elements and enables the improvement of productivity.

In the method, the ridge forming step preferably includes forming ridge portions on both sides of the resin sheet. The ridge portions formed on both sides of the resin sheet can reduce the contact area of the resin sheet with the surface of a separation membrane, so that a larger membrane surface can be used effectively. Also in this case, since grooves are formed on both sides, an adhesive resin can be allowed to spread well in the production of a membrane element (particularly in membrane leaf assembling), so that leakage from the membrane leaf can be prevented.

The ridge portions formed on both sides of the resin sheet preferably differ in height between both sides. This feature allows permeated water to flow mainly in the grooves formed by the higher ridge portions of the resulting permeation-side flow path material, so that the total pressure loss can be reduced.

The method preferably further includes a rectangle forming step including shaping cross-sections of the ridge portions close to a rectangular shape after the ridge forming step. Shaping the ridge portions close to a rectangular shape in this manner is effective in increasing pressure resistance and making the membrane surface less likely to be damaged.

On the other hand, the invention is directed to a permeation-side flow path material for use in a spiral membrane element, the permeation-side flow path material including a resin sheet having: a plurality of ridge portions formed parallel to one another; and a plurality of openings formed between each pair of the ridge portions. The permeation-side flow path material of the invention for use in a spiral membrane element includes a resin sheet having a plurality of ridge portions formed parallel to one another; and a plurality of openings formed between each pair of the ridge portions. Such a resin sheet can be produced by a simple process using inexpensive raw materials, which allows the provision of permeation-side flow path materials with stable quality. This makes it possible to provide inexpensive, high-quality, permeation-side flow path materials that are suitable for use in spiral membrane elements and enable the improvement of productivity.

For the same reason as mentioned above, the ridge portions are preferably formed on both sides of the resin sheet. In addition, the ridge portions formed on both sides of the resin sheet preferably differ in height between both sides. Moreover, the ridge portions preferably have a rectangular cross-sectional shape.

On the other hand, the invention is directed to a spiral membrane element including: a laminate including a composite semipermeable membrane, a supply-side flow path material, and a permeation-side flow path material; a perforated central tube on which the laminate is wound; and a sealing member for preventing mixing between a supply-side flow path and a permeation-side flow path, wherein the permeation-side flow path material is the permeation-side flow path material having any of the features set forth above. The features of the spiral membrane element of the invention allow the improvement of productivity, and make it possible to reduce the total cost and to improve the total productivity because the spiral membrane element of the invention can be produced using an inexpensive, high-quality, permeation-side flow path material.

MODE FOR CARRYING OUT THE INVENTION (Permeation-Side Flow Path Material)

The permeation-side flow path material of the invention is for use in a spiral membrane element. The general arrangement of the spiral membrane element will be described in detail later, in which all components, except for the permeation-side flow path material, may be those conventionally known in the art.

Figure 1:
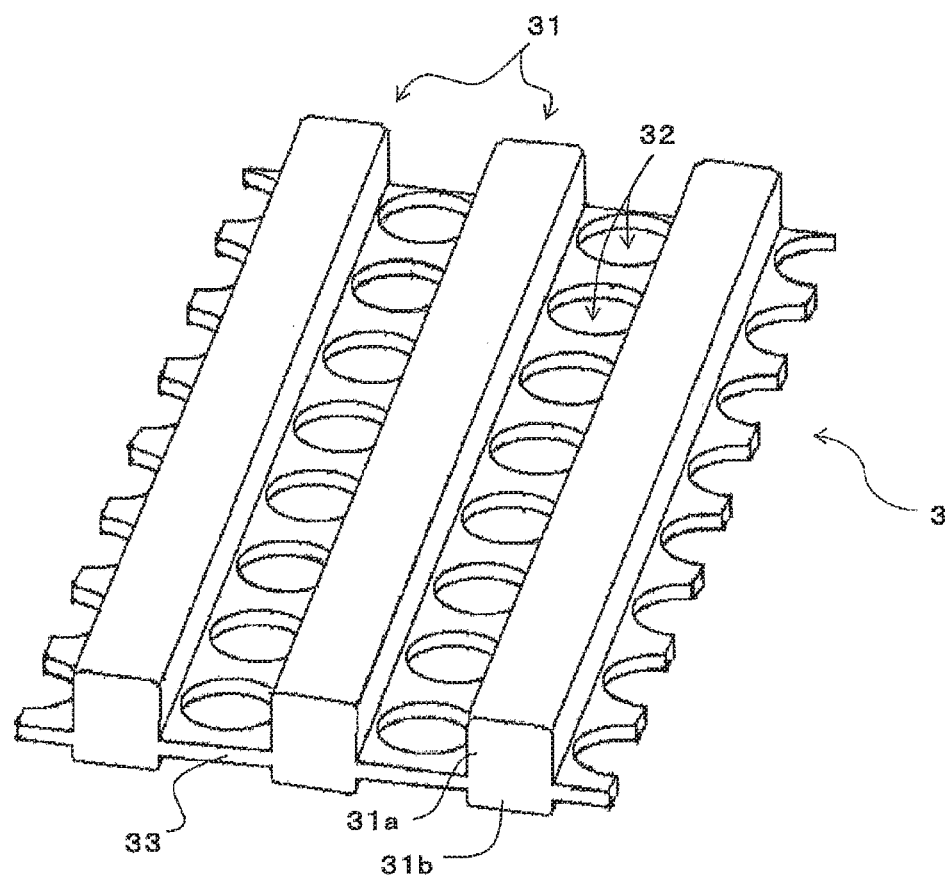
FIG. 1 is a perspective view showing an example of the permeation-side flow path material of the invention for use in a spiral membrane element.

As shown in FIG. 1, the permeation-side flow path material of the invention includes a resin sheet having: a plurality of ridge portions 31 formed parallel to one another; and a plurality of openings 32 formed between each pair of the ridge portions 31. Specifically, the openings 32 are formed in thinned portions 33 of the resin sheet. This embodiment shows an example where ridge portions 31 are formed on both sides of the resin sheet and include an upper-side ridge portion 31a and a lower-side ridge portion 31b, which differ in height between both sides.

The resin sheet may be made of any thermoplastic material. Preferably, for example, a polyester resin such as a polyethylene terephthalate resin or a polybutylene terephthalate resin, a polyolefin resin such as a polypropylene resin or a polyethylene resin, or a polyamide resin such as a nylon resin may be used to form the resin sheet. In the invention, the ridge portions 31 and the thinned portions 33 are integrally formed of the same material.

The total thickness of the permeation-side flow path material 3 is defined by the total height of the ridge portion 31 and the thickness of the thinned portion 33. In order to ensure a sufficient strength, a sufficient permeation-side flow path, and a sufficient membrane area of a membrane wound in the membrane element, the total thickness of the permeation-side flow path material 3 is preferably from 0.1 to 1 mm, more preferably from 0.2 to 0.4 mm. In order to ensure a sufficient permeation-side flow path and to provide a sufficient strength, the thickness of the thinned portion 33 is preferably from 0.01 to 0.1 mm, more preferably from 0.02 to 0.05 mm.

When the ridge portions 31 are formed on both sides of the resin sheet, the ratio of the higher ridge portion 31a to the lower ridge portion 31b is preferably from 1.5 to 10, more preferably from 2 to 5, in order to reduce the total pressure loss of permeation-side flow paths.

A groove is formed between the ridge portions 31. The width of the groove (the width of the upper surface portion) is preferably from 0.08 to 0.6 mm, more preferably from 0.1 to 0.45 mm, in order to ensure a sufficient permeation-side flow path and to suppress the membrane deformation-induced degradation of performance.

The width of the upper surface of the ridge portion 31 is preferably from 0.1 to 0.6 mm, more preferably from 0.15 to 0.4 mm, in order to protect the membrane surface. The cross-sectional shape of the ridge portion 31 is preferably a rectangle such as a square or an oblong or a trapezoid. In particular, the ridge portion 31 preferably has a rectangular cross-sectional shape. In the invention, the rectangular and other cross-sectional shapes are intended to include shapes with a chamfered corner or corners.

The openings 32 formed in the thinned portion 33 may have not only a circular shape but also an oval, long, or rectangular shape. In view of workability and strength, the openings 32 preferably have a circular or substantially circular shape.

The diameter or transverse length of the openings 32 formed in the thinned portion 33 should be substantially the same as the width of the groove. On the other hand, the length of the openings 32 in the direction along the groove may be controlled depending on the shape of the openings 32. For example, the length of long openings in the direction along the groove may be 1.1 to 5 times their transverse length. The area ratio of the openings 32 to the thinned portion 33 is preferably from 25 to 75% in view of strength and ease of spreading of an adhesive resin during assembling.

In view of workability, the openings 32 are preferably formed at positions regularly arranged between the ridge portions 31, more preferably formed at regular intervals. The positions at which the openings 32 are formed may be the same or different between the respective rows.

The three-dimensional shape of the opening 32 may have a constant cross-sectional shape or a cross-sectional shape increasing or decreasing in size along one direction.

The permeation-side flow path material of the invention for use in a spiral membrane element is preferably produced by the production method of the invention described below.

(Method for Producing Permeation-Side Flow Path Material)

Figure 2A:
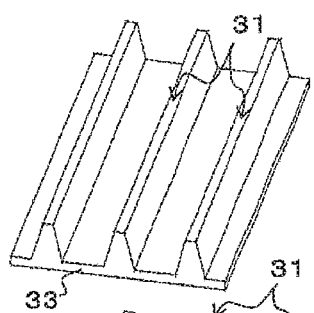
FIGS. 2(A) to 2(D) are process drawings showing an example of the method of the invention for producing a permeation-side flow path material for use in a spiral membrane element.
Figure 2B:
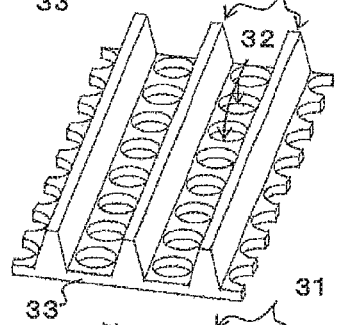
Figure 2C:
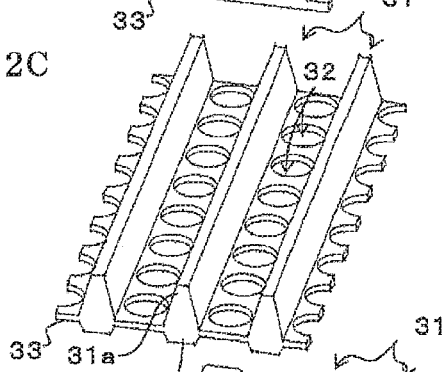
Figure 2D:
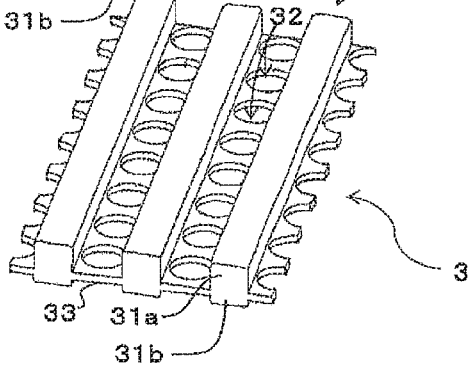
Figure 3:
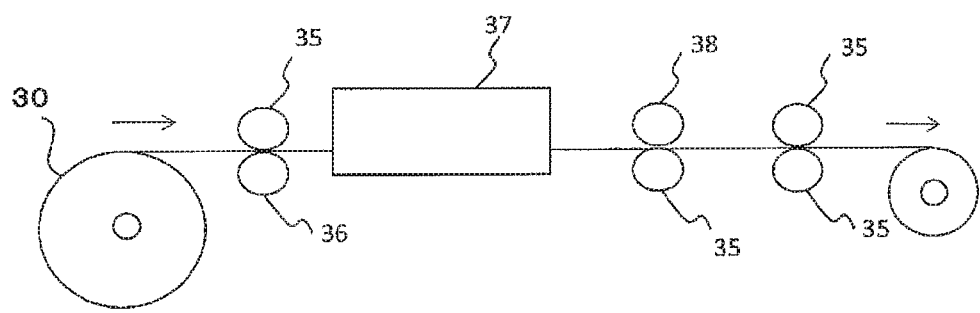
FIG. 3 is a schematic configuration diagram showing an example of an apparatus used in the production method of the invention.

As shown in FIGS. 2 and 3, the production method of the invention includes a ridge forming step including forming a plurality of ridge portions 31 in a direction along the longitudinal direction of a long resin sheet 30 while feeding the long resin sheet 30; and an opening forming step including forming a plurality of openings 32 in each of a plurality of rows in a direction along the longitudinal direction of the long resin sheet while feeding the long resin sheet. This embodiment shows an example where the ridge forming step is followed by the opening forming step. Alternatively, these steps may be performed in the reverse order.

As shown in FIG. 2(A), the ridge forming step includes forming a plurality of ridge portions 31. The ridge portions 31 may be formed using a method that includes forming a thermoplastic resin sheet 30 into a desired shape by heating and pressurization while unwinding and feeding the sheet 30 from a roll. For example, as shown in FIG. 3, the ridge forming step may be performed by embossing using an embossing roll 35 having a plurality of grooves along the circumferential direction and a smooth heating roll 36, between which the resin sheet is allowed to pass continuously. In this step, the heating and pressurization conditions may be appropriately selected depending on the material of the resin sheet 30 or the working speed. Alternatively, this step may be performed using a pressing machine equipped with a flat die having a plurality of parallel grooves, instead of the embossing roll, so that compression molding can be performed one by one.

In view of workability, the shape of the formed ridge portions 31 is preferably a shape widening toward the bottom, such as a trapezoid or a triangle. Also in view of workability, the ridge portions 31 are preferably formed higher than those to be obtained finally.

In this embodiment, ridge portions 31 are formed first on one surface of the resin sheet 30, and then ridge portions 31 are also formed on the other surface in a later step. Alternatively, this process may be performed by a single ridge forming step. In such a case, embossing may be performed using opposed embossing rolls, while the rolls are heated.

However, the embossing process should be performed in two steps as in this embodiment, because if deburring is necessary after perforating, the two-step process will be effective in making the working easy.

As shown in FIG. 2(B), the opening forming step includes forming a plurality of openings 32 in each of a plurality of rows. As shown in FIG. 3, the openings 32 may be formed by a method using a laser irradiator 37. Alternatively, punching may be performed using a press or other means, or perforating may be performed using a combination of a sharp-edge embossing roll and an elastic roll.

Subsequently, in this embodiment, as shown in FIG. 2(C), the thinned portions 33 are then further thinned by calendering or other working, so that lower-side ridge portions 31b are formed. For example, as shown in FIG. 3, the lower-side ridge portions 31b may be formed by embossing using an embossing roll 35 having a plurality of grooves along the circumferential direction and a heating roll 38 having a plurality of grooves for receiving the upper-side ridge portions 31a, between which the resin sheet is allowed to pass continuously.

Additionally, in this embodiment, as shown in FIG. 2(D), the ridge portions 31a and 31b on both sides are slightly flattened and adjusted in thickness to have desired thicknesses. For example, as shown in FIG. 3, the ridge portions 31a and 31b on both sides may be slightly flattened by embossing using two embossing rolls 35 each having a plurality of grooves along the circumferential direction, between which the resin sheet is allowed to pass continuously, while the rolls are heated. The ridge portions 31a and 31b may also be flattened and adjusted in thickness by being allowed to pass between smooth heating rolls.

Subsequently, as shown in FIG. 3, the final product may be wound on a roll, which is preferred in view of productivity. Alternatively, the long product may be cut into pieces without being wound on a roll, so that permeation-side flow path materials with a desired shape can be continuously produced. In addition, a resin sheet production process and the production process according to the invention may be linked in an integrated production line.

(Spiral Membrane Element)

Figure 5:
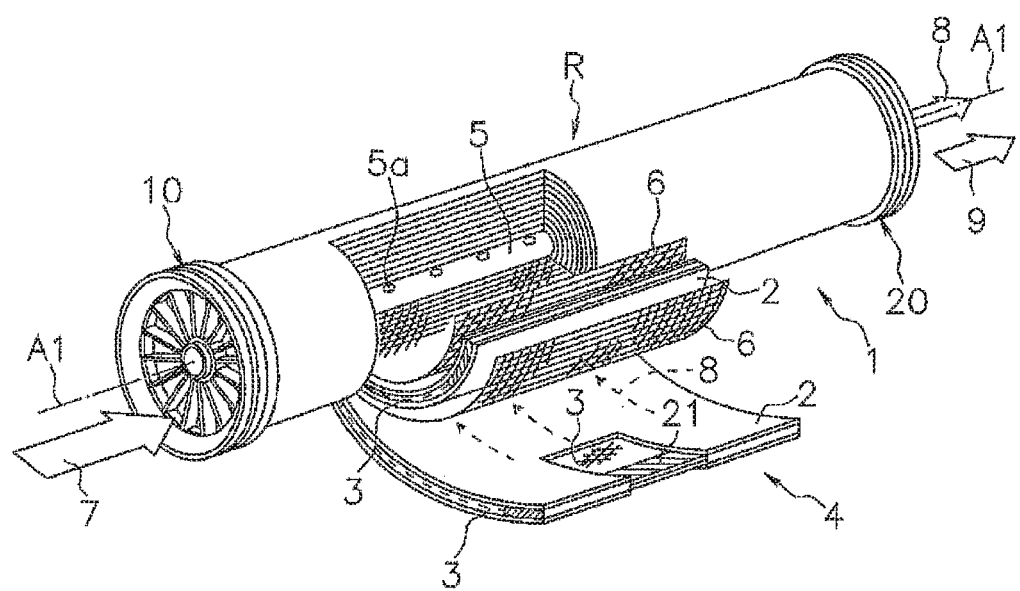
FIG. 5 is a partially cutaway perspective view showing an example of the spiral membrane element of the invention.

As shown in FIG. 5, the spiral membrane element of the invention includes a laminate including a composite semipermeable membrane 2, a supply-side flow path material 6, and a permeation-side flow path material 3; a perforated central tube 5 on which the laminate is wound; and a sealing member 21 for preventing mixing between the supply-side flow path and the permeation-side flow path. The spiral membrane element of the invention has the feature that the permeation-side flow path material 3 used is according to the invention. In this embodiment, an example of a roll R is shown in which a plurality of separation membrane units each including the composite semipermeable membrane 2, the supply-side flow path material 6, and the permeation-side flow path material 3 are wound around the central tube 5.

For example, an envelope-shaped membrane 4 (bag-shaped membrane) may be formed by placing the composite semipermeable membranes 2 on both surfaces of the permeation-side flow path material 3 and bonding their three sides. In this case, the sealing member 21 for preventing mixing between the supply-side flow path and the permeation-side flow path is formed at an outer circumference end side, and the sealing members 21 are also formed at an upstream end side and a downstream end side, respectively. In addition, the sealing members 21 are also preferably formed between the central tube 5 and the inner circumference end of the upstream end side and between the central tube 5 and the inner circumference end of the downstream end side.

The roll R is formed by attaching the opening of the envelope-shaped membrane 4 to the central tube 5 and spirally winding the envelope-shaped membrane 4 and the net-shaped (mesh-shaped) supply-side flow path material 6 on the outer surface of the central tube 5. For example, an upstream end member 10 such as a seal carrier is provided on the upstream side of the roll R, and optionally, a downstream end member 20 such as a telescope phenomenon-preventing member is provided on the downstream side of the roll R.

During the operation of the membrane element 1, a liquid 7 is supplied from one end of the membrane element 1. The supplied liquid 7 is allowed to flow along the supply-side flow path material 6 and in a direction parallel to the direction A1 of the axis of the central tube 5, and discharged as a concentrated liquid 9 from the other end of the membrane element 1. A permeated liquid 8 also passes through the composite semipermeable membranes 2 during the process of allowing the supplied liquid 7 to flow along the supply-side flow path material 6. As indicated by the broken line arrow in the drawing, the permeated liquid 8 is allowed to flow along the permeation-side flow path material 3 and into the interior of the central tube 5 from perforations 5a, and discharged from the end of the central tube 5.

In general, the supply-side flow path material 6 has the function of ensuring a space enough to evenly supply the fluid over the membrane surface. The supply-side flow path material 6 with such a function may be, for example, a net, a knit fabric, or an embossed sheet. Any appropriate material with a maximum thickness of about 0.1 to about 3 mm may be used as needed. The supply-side flow path material 6 is preferably such that it has low pressure loss and can cause a moderate level of turbulent effect. In general, different flow path materials, such as the supply-side flow path material 6 on the supplied liquid side and the permeation-side flow path material 3 on the permeated liquid side, are placed on both surfaces of the separation membrane. The supply-side flow path material 6 should be a thick, large-mesh net-shaped flow path material whereas the permeation-side flow path material 3 should be a small-mesh, woven or knit fabric flow path material.

When an RO membrane or an NF membrane is used for seawater desalination, waste water treatment, or other applications, the supply-side flow path material 6 is placed inside the two-folded composite semipermeable membrane. In general, the supply-side flow path material 6 used preferably has a network structure in which linear parts are arranged to form a lattice.

The material used to form the supply-side flow path material 6 may be, but not limited to, polyethylene or polypropylene. These resins may contain a microbicide or an antimicrobial agent. The thickness of the supply-side flow path material 6 is generally from 0.2 to 2.0 mm, preferably from 0.5 to 1.0 mm. If it is too thick, the amount of the membranes capable of being housed in the element can decrease, as well as the amount of permeation. Contrarily, if it is too thin, deposition of fouling materials can easily occur to cause clogging so that degradation of permeability can easily occur.

In the invention, particularly when the supply-side flow path material 6 with a thickness of 0.6 to 0.9 mm is combined with other components, the element can resist the deposition of fouling materials and also resist biofouling, so that the reduction of the flux can be suppressed even during continuous operation.

The central tube 12 may be any type of tube having perforations 12a in its circumference. Any conventional tube may be used as the central tube 12. In general, when the element is used for seawater desalination, waste water treatment, or the like, the permeated water passing through the composite semipermeable membranes 2 enters the central tube 12 from the perforations of the wall to form a permeate flow path. The central tube 12 generally has a length larger than the axial-direction length of the element. Alternatively, a structure of two or more segments joined together may also be used to form the central tube 12. The material used to form the central tube 12 may be, but not limited to, thermosetting resin or thermoplastic resin.

In the spiral membrane element of the invention, both ends of the roll R after resin sealing may be subjected to trimming or other processes for adjusting the length in the axial direction A1. If necessary, other components may be further provided, such as a perforated end member for preventing deformation (such as telescope phenomenon), a sealant, a reinforcement, and an exterior material.

The composite semipermeable membrane preferably includes a porous support and a separation function layer on the surface of the porous support. The porous support preferably includes a nonwoven fabric and a polymer porous layer formed on the nonwoven fabric. The composite semipermeable membrane with such features may be called a reverse osmosis (RO) membrane, a nanofiltration (NF) membrane, or a forward osmosis (FO) membrane depending on the filtration performance or the treatment method. The composite semipermeable membrane with such features can be used for ultra-pure water production, seawater desalination, brackish water desalination, wastewater recycling, and other applications.

The separation function layer may be, for example, a polyamide-based, cellulose-based, polyester-based, or silicone-based separation function layer. The membrane preferably has a polyamide-based separation function layer. The polyamide-based separation function layer is generally a homogeneous film with no visible pores and has the desired ability to separate ions. The separation function layer may be any polyamide-based thin film resistant to peeling off from the polymer porous layer. For example, there is well-known a polyamide-based separation function layer formed by subjecting a polyfunctional amine component and a polyfunctional acid halide component to interfacial polymerization on a porous support membrane.

Such a polyamide-based separation function layer is known to have a pleated microstructure. The thickness of the polyamide-based separation function layer may be, but not limited to, about 0.05 to about 2 $\mu$m, preferably 0.1 to 1 $\mu$m. It is known that if this layer is too thin, membrane surface defects will easily occur, and if it is too thick, permeability will decrease.

Any known method may be used to form the polyamide-based separation function layer on the surface of the polymer porous layer. Examples of known methods include interfacial polymerization methods, phase separation methods, and thin-film coating methods. In particular, interfacial polymerization methods are preferably used in the invention. An example of the interfacial polymerization method may include coating the polymer porous layer with an aqueous amine solution containing a polyfunctional amine component and then bringing a polyfunctional acid halide component-containing organic solution into contact with the aqueous amine solution-coated surface to allow interfacial polymerization to occur and to form a skin layer.

The nonwoven fabric layer may be of any type capable of maintaining the separation and permeation performance of the composite semipermeable membrane and imparting a suitable level of mechanical strength. A commercially available nonwoven fabric may be used to form the nonwoven fabric layer. The nonwoven fabric layer may be made of, for example, polyolefin, polyester, or cellulose. A mixture of two or more materials may also be used to form the nonwoven fabric. Particularly in view of formability and cost, polyester is preferably used. A long fiber nonwoven fabric or a short fiber nonwoven fabric may also be used as needed. Preferably, a long fiber nonwoven fabric is used in view of fine fluff, which can cause pinhole defects, or membrane surface uniformity. The air permeability of the nonwoven fabric layer alone used in this case may be, but not limited to, about 0.5 to about 10 $cm^3/cm^2 \cdot s$, preferably about 1 to about 5 $cm^3/cm^2 \cdot s$.

The polymer porous layer may be of any type capable of forming the polyamide-based separation function layer. In general, the polymer porous layer should be a microporous layer with a pore size of about 0.01 to about 0.4 µm. Any of various materials such as polyaryl ether sulfone such as polysulfone and polyether sulfone, polyimide, and polyvinylidene fluoride may be used to form the microporous layer. In particular, polysulfone or polyaryl ether sulfone is preferably used to form the polymer porous layer because of its chemical, mechanical, and thermal stability.

An example of a method for producing the polymer porous layer will be shown, in which polysulfone is used as the polymer. The polymer porous layer can be produced by a method generally called a wet process or a dry-wet process. The polymer porous layer can be formed on the nonwoven fabric by a process including the steps of: preparing a solution of polysulfone and various additives in a solvent; coating the nonwoven fabric with the solution; drying the solution to vaporize the solvent from the solution and to produce microphase separation; and fixing the product by immersion in a coagulation bath such as a water bath. The thickness of the polymer porous layer can be set by adjusting the concentration of the solution and the coating amount and also taking into account the amount of the polymer with which the nonwoven fabric layer will be impregnated.

Figure 4A:
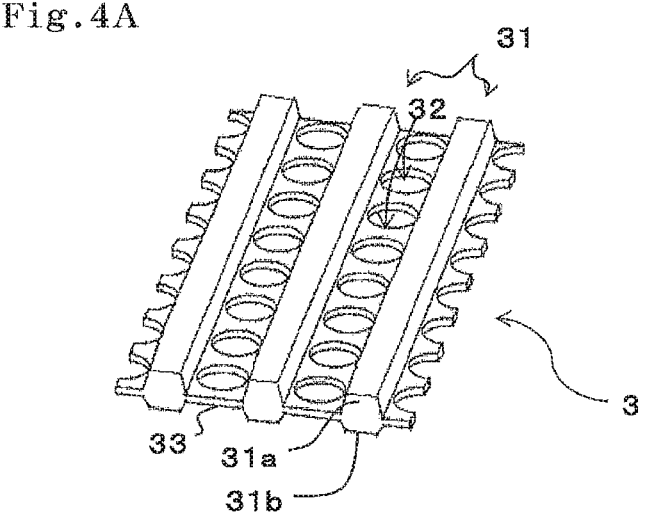
FIGS. 4(A) to 4(C) are perspective views showing other examples of the permeation-side flow path material of the invention for use in a spiral membrane element.

Other Embodiments (1) The embodiment described above shows an example where the ridge portions 31 provided have a rectangular cross-sectional shape. Alternatively, shown in FIG. 4(A), the ridge portions 31 provided may have a trapezoidal cross-sectional shape. In such a case, the permeation-side flow path material of the invention can be produced by a simpler process. In such a case, the ridge portions 31 can also have a reduced contact area with the separation membrane while maintaining the same strength.

Figure 4B:
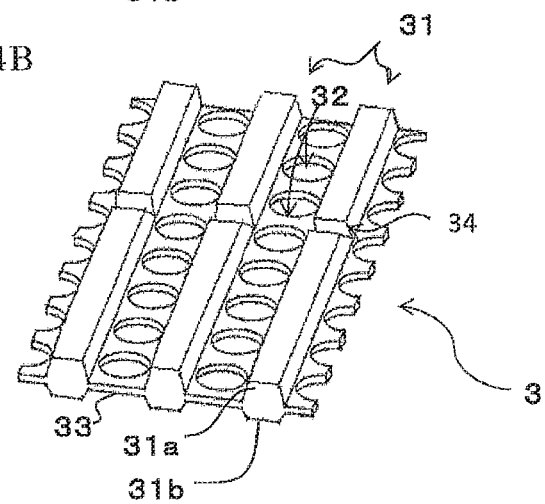
Figure 4C:
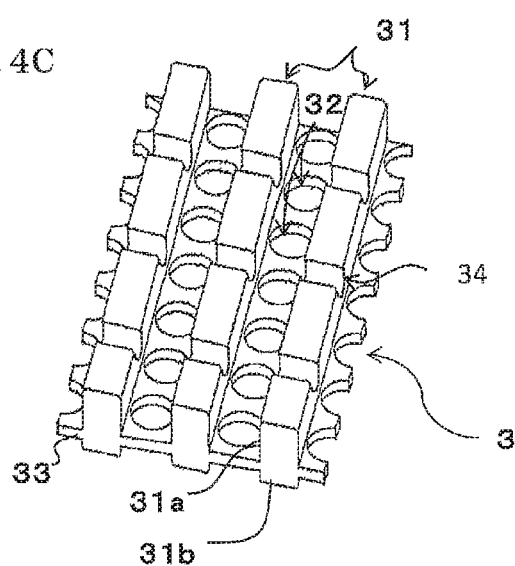

(2) The embodiment described above shows an example where the ridge portions 31 provided are not intermittent and continuous in the longitudinal direction. Alternatively, as shown in FIG. 4(B) or 4(C), the ridge portions 31 may be provided with transverse grooves 34 across the longitudinal direction. Such transverse grooves 34 can be formed using an embossing roll having ridge portions corresponding to the transverse grooves 34. The transverse grooves 34 formed in such a manner can equalize the flow rates of the permeated liquids flowing in the grooves between the ridge portions 31, so that the total pressure loss can be further reduced. Additionally, in the process of forming the roll, the transverse grooves 34 can reduce the bending stiffness of the permeation-side flow path material, which makes the roll forming operation easy.

Particularly in the example shown in FIG. 4(C), the transverse grooves 34 are formed with a smaller pitch (in other words, at smaller intervals), so that the permeation-side flow path material can be bent at a more uniform radius of curvature when the roll is formed.

DESCRIPTION OF REFERENCE SIGNS

2 Composite semipermeable membrane
3 Permeation-side flow path material
5 Central tube
6 Supply-side flow path material
21 Sealing member
31 Ridge portion
31a Ridge portion (upper side)
31b Ridge portion (lower side)
32 Opening

The invention claimed is:

1. A method for producing a material, the method comprising:
  a ridge formation comprising forming a plurality of ridge portions in a direction along a longitudinal direction of a long resin sheet while feeding the long resin sheet, wherein the long resin sheet is not a knit fabric; and
  an opening formation comprising forming a plurality of openings in each of a plurality of rows in a direction along the longitudinal direction of the long resin sheet while feeding the long resin sheet,
  wherein the material comprises:
  the plurality of ridge portions formed parallel to one another;
  at least one thinned portion formed between at least one mutually adjacent pair of the ridge portions; and
  the plurality of openings formed in the at least one thinned portion, wherein a diameter of each of the plurality of openings is substantially the same as a width of a groove that spans a distance between the at least one mutually adjacent pair of the ridge portions,
  wherein a diameter of each of the plurality of openings is substantially the same as a width of a groove that spans a distance between the at least one mutually adjacent pair of the ridge portions; and
  wherein the material is a permeation-side flow path material for use in a spiral membrane element.

2. The method according to claim 1, wherein the ridge formation comprises forming ridge portions on both sides of the resin sheet.

3. The method according to claim 2, wherein the ridge portions formed on both sides of the resin sheet differ in height between both sides.

4. The method according to claim 1, further comprising a rectangle formation comprising shaping cross-sections of the ridge portions close to a rectangular shape after the ridge formation.

5. A material, comprising:
  a resin sheet comprising:
    a plurality of ridge portions formed parallel to one another;
    at least one thinned portion formed between at least one mutually adjacent pair of the ridge portions;
    a plurality of openings formed in the at least one thinned portion; wherein the resin sheet is not a knit fabric, wherein a diameter of each of the plurality of openings is substantially the same as a width of a groove that spans a distance between the at least one mutually adjacent pair of the ridge portions, wherein a diameter of each of the plurality of openings is substantially the same as a width of a groove that spans a distance between the at least one mutually adjacent pair of the ridge portions; and the material is a permeation-side flow path material for use in a spiral membrane element.

6. The material according to claim 5, wherein the ridge portions are formed on both sides of the resin sheet.

7. The material according to claim 6, wherein the ridge portions formed on both sides of the resin sheet differ in height between both sides.

8. The material according to claim 5, wherein the ridge portions have a rectangular cross-sectional shape.

9. A spiral membrane element comprising:
a laminate comprising a composite semipermeable membrane, a supply-side flow path material, and a permeation-side flow path material;
a perforated central tube on which the laminate is wound; and
a sealing member for preventing mixing between a supply-side flow path and a permeation-side flow path, wherein
the permeation-side flow path material is the material according to claim 5.

10. The material according to claim 5,
wherein the resin sheet comprises a first side and a second side opposite the first side;
wherein the ridge portions comprise first ridge portions formed on the first side and second ridge portions formed on the second side;
wherein the first ridge portions are aligned with the second ridge portions.

11. The material according to claim 5, wherein thickness of the at least one thinned portion is 0.01 mm to 0.1 mm.

12. The material according to claim 5, wherein thickness at a thickest portion of the material is 0.1 mm to 1 mm.

13. The material according to claim 5, wherein gap between adjacent pairs of the ridge portions is 0.08 mm to 0.6 mm.

14. The material according to claim 5, wherein fractional area of the openings as a percentage of the at least one thinned portion inclusive of the openings is 25% to 75%.

15. The material according to claim 5, wherein the resin sheet comprises thermoplastic resin.

16. The material according to claim 10,
wherein the first ridge portions and the second ridge portions are arranged in mutually opposed fashion.

17. The material according to claim 5,
wherein the resin sheet comprises a first side and a second side opposite the first side;
wherein the ridge portions comprise at least one first ridge portion formed on the first side and at least one second ridge portion formed on the second side;
wherein the at least one first ridge portion and the at least one second ridge portion are arranged in mutually opposed fashion.

* * * * *

UNITED STATES PATENT AND TRADEMARK OFFICE
CERTIFICATE OF CORRECTION

PATENT NO. : 10,874,993 B2
APPLICATION NO. : 15/519603
DATED : December 29, 2020
INVENTOR(S) : Uda It is certified that error appears in the above-identified patent and that said Letters Patent is hereby corrected as shown below:

In the Claims

At Column 10, Line 40 (Claim 1, Line 17), please delete "wherein a diameter of each of the plurality of openings is substantially the same as a width of a groove that spans a distance between the at least one mutually adjacent pair of the ridge portions,".

At Column 11, Line 1 (Claim 5, Line 9), please delete "wherein a diameter of each of the plurality of openings is substantially the same as a width of a groove that spans a distance between the at least one mutually adjacent pair of the ridge portions,".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*